Feb. 4, 1964 A. LAGARDE 3,120,602
REMOVABLE ROBOT-ACCOUNTING IMPULSION TOTALIZATOR CARTRIDGE
Filed July 24, 1961 2 Sheets-Sheet 1

INVENTOR
Auguste LAGARDE
ATTORNEYS

INVENTOR
Auguste LAGARDE
ATTORNEYS

United States Patent Office 3,120,602
Patented Feb. 4, 1964

3,120,602
REMOVABLE ROBOT-ACCOUNTING IMPULSION TOTALIZATOR CARTRIDGE
Auguste Lagarde, 24 Rue Louis Girard, Velizy, France
Filed July 24, 1961, Ser. No. 127,448
1 Claim. (Cl. 235—92)

The present invention relates to a device for the control of various quantities such as prices, expenditures, goods or other accountable values by using an electrical impulse generator the frequency of which is adjusted in relation to the values to be controlled. The invention more particularly relates to means capable of ensuring the mechanical registration of the said electrical impulses.

An object of the invention lies in the provision, in a movable, removable and individualized enclosure or case of small volume provided with various electrical circuits ending at the terminals of a base, of means for converting the electrical impulses into mechanical impulses which may be registered on at least one incorporated meter and other means for the positioning and locking of the said case on a board connected to the impulse generator, including at least one case supporting socket connected to the above mentioned electrical circuits.

Another object of the invention is to mount on the said socket supporting board connected to the impulse generator on which support may be mounted a removable case, various complementary circuits for normal work, safety and theftproofing with visual or audible signalling means which would attract the user's attention on a malfunctioning of the registering case integrated by its terminals in the socket of the said board and also to indicate any attempt at fraud.

A further object of the invention resides in the provision, according to the use of which it is intended, of a board having a certain number of sockets capable of receiving each a registering case, so that the same board may simultaneously serve to support several registering cases belonging to different users.

Yet another object of the invention consists in providing means on the board to cause the closing of various circuits and the operation of the impulse generator whenever a registering case is located into position on the board.

In accordance with the above mentioned objects of the present invention, the movable enclosure or case includes a cartridge which may be constituted by a cylindrical body made of metal or plastic and the upper end of which has a slit while the lower end thereof includes a detachable base through which a certain number of conductors extend. The casing will contain a winding-drum meter, an electro-magnet receiving electrical impulses coming from the generator and transmitting them to the meter by a moving blade and certain electrical conducting elements.

Two meters can be placed in the same cartridge body and also two independent electro-magnets having different characteristics thus making it possible to obtain a totalization coming from two different sources.

A single reel can superpose the two above mentioned reels so that a mixed impulse can be given to the two totalizors.

An electrical circuit is included consisting of a Wheatstone bridge having three resistances terminating in the supporting socket of the board while a fourth one is in the cartridge and therefore movable therewith. The resistances form a normally balanced network, all of which can be put into action if the resistance introduced by a certain cartridge does not correspond with the balance value of the bridge since in such a case, means are provided to cause the impulse circuit to open. Therefore, an anti-fraud apparatus is formed in the case where a different cartridge having a resistance which does not correspond to that of the bridge is put into place. Also, the mounting could be reversed and the bridge normally out of balance and become balanced when a different resistance is introduced.

The different circuits placed in the frame or board and in the cartridge for the above mentioned purposes can be built into a single circuit provided with different relays, for example: working relay, security relay, theftproof reley, with auxiliary visual and codified audible signalling apparatus, steady lights, blinking lights, bells or any other means to attract the attention on any irregularities of operation.

The same result could be obtained by replacing the bridge by thermistances or a certain number of relay series.

The introduction of the cartridge in the supporting socket is insured by a protective case, closed at its upper end, open in its lower end and enclosing the cartridge, the case having means for gripping and locking, such as screw threads, locking slits and notches cooperable with a locking pin at the base, or catches on springs which can fit into grooves in the base of the cartridge; furthermore, locking means is provided to prevent the withdrawal of the cartridge by unauthorized persons.

Locking may be obtained through an electro-magnet. It may consist, for instance, of an electro-magnet mounted in an electrical circuit with a Wheatstone bridge having a resistance placed at the bottom of the case. The bridge is normally balanced, but becomes unbalanced if the case or any other gripping means is used which does not have a resistance corresponding to the balance value. As soon as the circuit is closed, the electro-magnet causes a locking pin to engage into a slot provided through the case which thus becomes locked.

Other characteristics will appear in the course of the following description which refers to the accompanying drawings, wherein.

Figure 1:
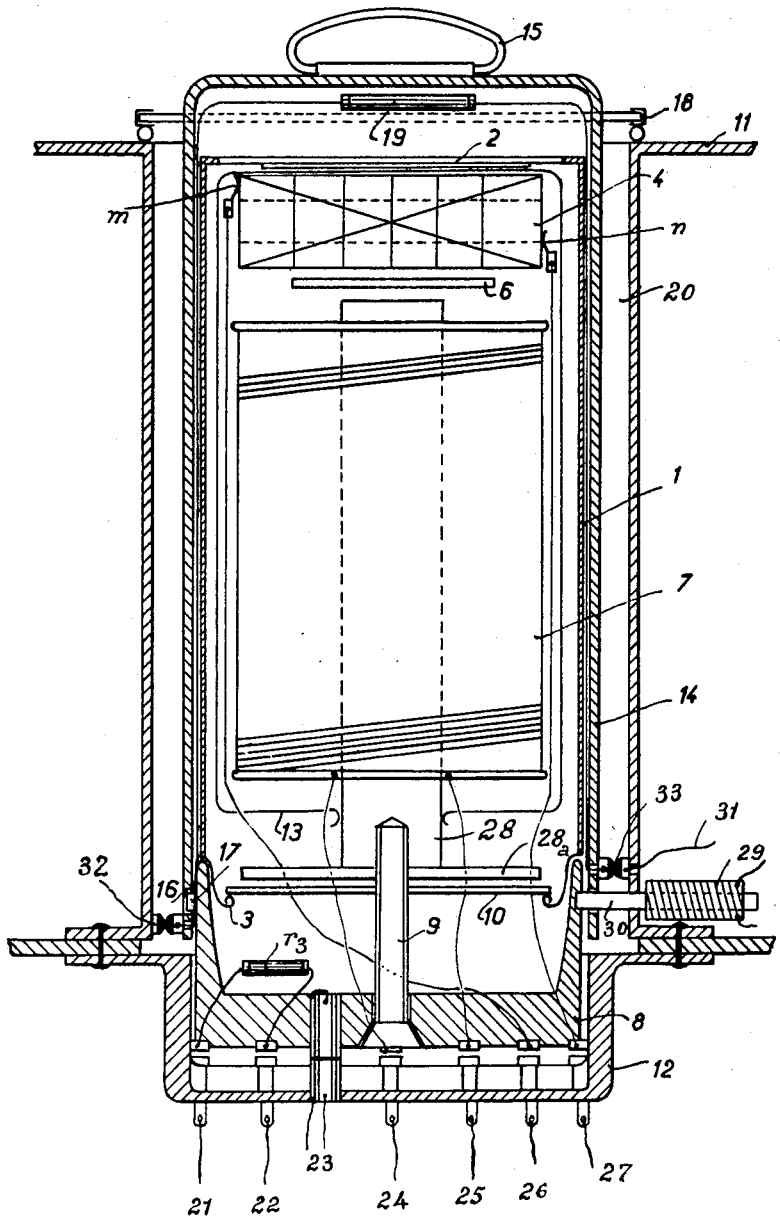
FIG. 1 is a longitudinal cross-sectional view of a greatly enlarged case mounted on a supporting socket.

The case 14 shown comprises a cartridge formed as a cylindrical body 1 made of metal or plastic, closed at its upper end but having a slot 2 allowing visibility for the reading of a meter 4. The body 1 is open at its lower end and has a shouldering flange 3 curved inwardly toward the axis thereof for the positioning and mounting of a base 8. Within body 1, on some part of the body frame (not shown) are fixed: a multiple reel meter 4 rotatable around an axis 5, driven by relaying pinions, in a known manner; a pivoting blade 6 (this blade is joined to the pinions by a fork), and an electro-magnet 7 to drive the blade 6. The base 8 is fixed to the body 1 by a central screw 9 threaded in the core of the electro-magnet. Tightening of screw 9 forces plate 28a against cross-pieces 10 resting on the flange 3, and the base 8 against body 1. A frame 11, having dimensions suiting the number of sockets and cases to be received, has a certain number of cylindrical chambers 20 at the bottom of which are fixed the sockets 12. Each chamber 20 receives a case engaged in a socket 12. The base 8 and socket 12 are provided with contacts and terminals connecting the circuits in the frame 11 with those within the cartridge 1.

The meter and the electro-magnet can be placed in an envelope 13 made of a transparent plastic material. Case 14 is coaxial with body 1 and fits around the said cartridge body. It is further provided with a handle 15 and has, at its lower end, bayonet slots 16 cooperating with locking pins 17 on base 8; when the case is completely engaged over the cartridge, it is sufficient to pull the handle 15 to free the whole assembly. An insulated lid 18 can be placed at the upper end of chamber 20 in order to prevent rust from entering. To the bottom of the case 14 is fixed a resistance 19 (see below handle 15) connected to a circuit, as will be explained later. At the bottom of the base or embedded therein is a bridge resistance $r_3$, connected to another circuit which will also be described later. The terminals 21—22 coming out of base 8 are made to join resistance $r_3$ to the bridge of the frame. A jack 23 opens and closes the impulse circuit. The terminals 24—25 are connected to the electro-magnet of the cartridge and terminals 26—27 are connected to the circuit going through the adding meter.

Figure 2:
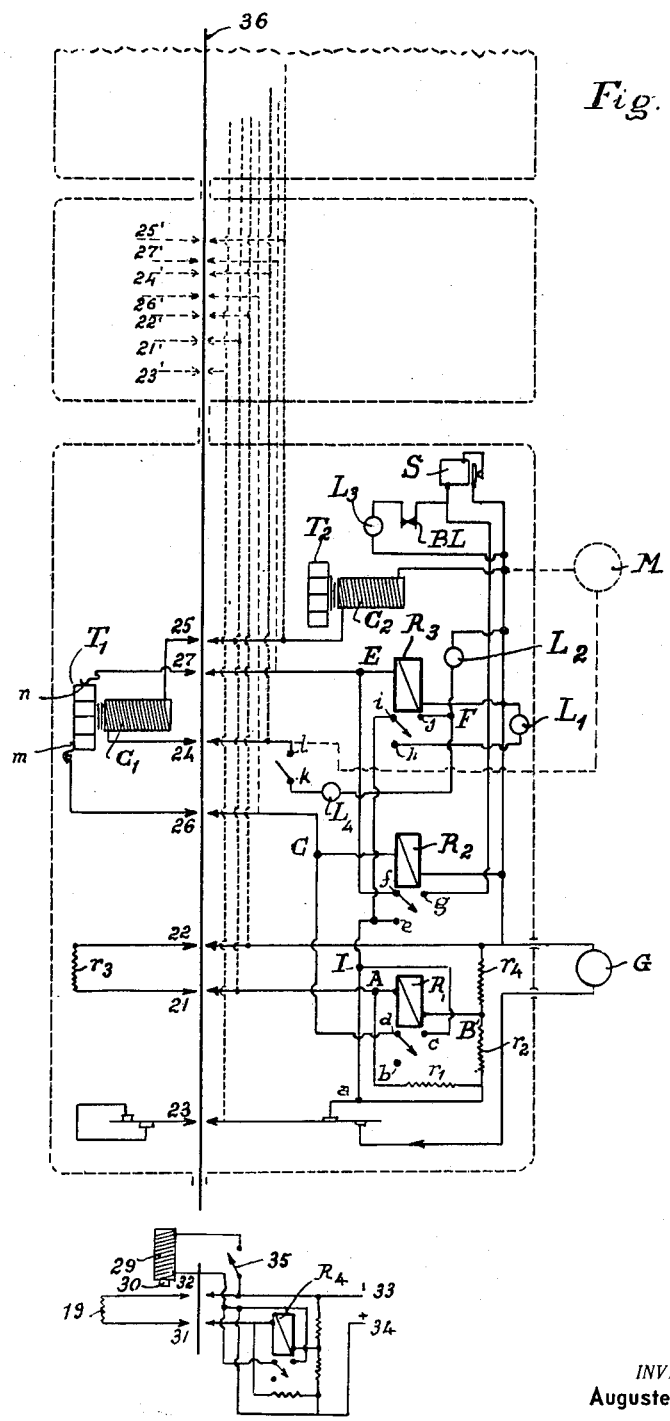
FIG. 2 is a diagram of the various electrical circuits incorporated in the frame, the supporting socket, the base of the cartridge, and the cartridge itself.

FIGURE 2 illustrates a diagram of the various electrical circuits. Vertical line 36 indicates the surface of the board. All circuits to the left of this line are the movable circuits, that is, the ones that are solid with the accounting cartridges placed on the board: all of the circuits to the right of the vertical line are located within the socket supporting frame receiving the accounting cartridges.

When no cartridge is mounted on the board, the contacts $db$ for relay $R_1$ of the Wheatstone bridge, $fe$ for relay $R_2$, called safety relay, $ih$ for relay $R_3$ or work relay; switch $kl$ is open and the current does not flow.

When a cartridge is disposed in a socket of the board, switch $kl$ closes and jack 23 closes the circuit.

If the operation is normal, the impulse generator G applies current at "$a$." Since the Wheatstone bridge is balanced, current goes through $ef$, E and $R_3$; contacts $ih$ become $ij$. The current goes through F, then by $L_2$ which lights up and by bulb $L_4$, on through the circuit $kl$; from there the current goes through the contacts 24—25 through meters $C_1$, $C_2$. The impulses are recorded on meters $T_1$, $T_2$.

In the case where the cartridge would not have the resistance $r_3$ balancing the bridge, the current goes from A to B through relay $R_1$, then from "$a$" to I, $cd$, C, $R_2$; $fe$ becomes $fg$; the current no longer flows through the work relay $R_3$. $L_2$ is shut, the impulses no longer go through meters $C_1$, $C_2$; $ij$ becomes $ih$; bulb $L_1$ lights up; the current goes through S (alarm) BL (twin blade) and flickering bulb $L_3$. The irregular cartridge is immediately picked out and must be withdrawn in order to resume normal operation.

In the case where meter $C_1$ reaches maximum recording, the Wheatstone bridge being balanced, the current normally goes through the work relay $R_3$; the impulses are recorded. As soon as the meter reaches its maximum value, "$m$" and "$n$" are short circuited; from E the current flows through 27, $n$, $T_1$, $m$, 26 and reaches C; contacts $fd$ become $fg$ on the safety relay $R_2$; the current is cut off on the work relay $R_3$ but flows through the safety device S and $L_3$.

As is shown in FIG. 2, the board may include a certain number of cartridge-supporting sockets. Shown in broken lines are the conductors which end up at the terminal 23' (jack) 21', 22' (bridge terminals) 26', 27' (meter terminals) 24', 25' (winding terminals). The board may be provided with "$n$" sockets to support, simultaneously, "$n$" cartridges.

In the case where the device is used simultaneously for counting the impulses and cause actuation of a driving element (fuel distribution pump, opening of a store case or others) a motor M may be located in a circuit the terminals of which connect the circuit going through meters $C_1$, $C_2$ (broken lines).

In the lower part of FIGURE 2, the cartridge locking on the board has been shown. This circuit connected through terminals 33, 34 to an independent source of current comprises a bridge in connection with a coil 29 operating the displacement of a sliding pin 30.

When there is no cartridge in the board chambers, the bridge is unbalanced. If contact 35 is open, relay $R_4$ is at rest. If contact 35 is closed, relay $R_4$ is closed and the current goes through coil 29.

When a cartridge having a resistance 19 which balances the bridge is located into position, relay $R_4$ no longer operates; the current does not flow through the coil and the pin 30 under the action of a spring (not shown) is mechanically actuated. Unlocking is obtained through electro-magnetic action by closing contact 35.

If the cartridge mounted on the board has a resistance 19 the value of which does not correspond to that for which the balancing of the bridge is obtained, the bridge is unbalanced, the pin 30 is actuated and the cartridge may not be taken out.

Various modifications may be made to the above described embodiment without departing from the scope of the present invention.

It is obvious that the removable and individualized case is capable of various applications and modifications in accordance with the use intended.

If, for instance, the cartridge case is applied to a product distributor in a store, it may be mounted as a pistol barrel in order to facilitate its use. It may include telescopic contacts releasable by triggering action, the final breaking contact of which when the cartridge case is connected releases the device which liberates the chosen goods and inscribe on the counter the price of the acquired goods.

In the case of turnstiles of paying entrances at varying rates, two or three stars of 2, 3 or 4 sockets are placed side by side. Each star has the form of a socket; the stars being independent and operating the same turnstile. The socket which has received the cartridge case liberating the turnstile, rotates one half, one third or one quarter of a turn under the action of the user's hand which holds the cartridge case.

In the case where the cartridge case is used for the renting of chauffeurless taxicabs, the said cartridge case is provided with two independent meters. The first meter registers the closing and opening doors of the parking doors and the impulses corresponding to stopping rates outside the parking; the second meter registers the impulse rates while on transit.

Whichever is the use intended, the totalizing element generally called "the cartridge" is always a movable, removable, and individualized element, that is, belonging to a particular user, the meter or meters of said cartridge case indicating a value which may have been previously paid and give the owner a right to a purchase or to an expenditure up to the main amount or to be paid after the expenditure in accordance with the registered figure.

I claim:

An accounting device comprising: a frame; at least one chamber through said frame having a socket at the bottom thereof; a series of electrical terminals in said socket; a cartridge assembly including an outer case and an inner cartridge, removably received in said chamber; said cartridge having a base received in said socket and provided with a series of electical terminals equal in number and in position to those of the socket and so arranged that the terminals of both said base and said socket will contact one another two-by-two when said assembly is in said chamber; counting meter means mounted in said cartridge and including a cooperating driving electromagnet for actuating said meter means; said meter means being responsive to electrical impulses of predetermined frequency, the magnitude of which is relative to the value to be registered by said meter; a normally balanced Wheatstone bridge circuit, one resistance of which is connected to two base terminals and is located in said assembly while the remaining resistances are connected to the corresponding two socket terminals and are located in said frame; said meter means and said electromagnet means being electrically connected to the remaining base terminals and electrical means including alarm devices being connected to the other socket terminals and to said Wheatstone bridge circuit in such a way that an alarm is given whenever the base resistance of the Wheatstone bridge circuit is changed and the bridge balance is broken.

References Cited in the file of this patent

UNITED STATES PATENTS

| | | |
|---|---|---|
| 1,084,634 | Heuser | Jan. 20, 1914 |
| 1,568,164 | Kaisling | Jan. 5, 1926 |
| 2,901,740 | Cutsogeorge | Aug. 25, 1959 |
| 2,926,703 | Summerer | Nov. 29, 1960 |

OTHER REFERENCES

"Elemeg" Catalogue, the Presin Co., 2014 Broadway, Santa Monica, California, published prior to Nov. 17, 1958.

"Pic" Catalogue Production Instrument Co., 710 W. Jackson Blvd., Chicago 6, Illinois.